Nov. 15, 1955  J E. COATES  2,723,699
LOCK NUT WITH ELASTIC LOCKING INSERT
Filed Feb. 19, 1951

INVENTOR
J Edwin Coates

United States Patent Office 2,723,699
Patented Nov. 15, 1955

2,723,699

LOCK NUT WITH ELASTIC LOCKING INSERT

J Edwin Coates, Santa Monica, Calif., assignor to Douglas Aircraft Company, Inc., Santa Monica, Calif.

Application February 19, 1951, Serial No. 211,721

3 Claims. (Cl. 151—7)

This invention relates to elastic stop nuts of both the internal and external wrenching variety and more particularly is concerned with a novel means for retaining the fastener binding insert within the nut.

Various expedients have been proposed for maintaining the elastic fastener binding insert properly seated in a more or less permanent condition. The internal wrenching species usually incorporates such constructions as insert holding points or rims which are formed by broaching downwardly from the upper inner periphery of the socket onto the internally located insert. This operation is generally followed by swaging or coining the broached metal into more firm contact with the insert.

In the externally wrenched variety the insert is seated in the bore at or near one end thereof and it is usually necessary to form an axially extending annular flange at this end of the bore. The flange is then swaged or beaded downwardly onto the stop member. The present invention provides an elastic stop nut in which the anchorage of the stop member can be completed without broaching, swaging or other relatively complex and expensive fabrication steps which have led to high breakage loss in manufacturing because of the high hardness of the nut body. In recent years users of elastic stop nuts have called for nut bodies of even higher hardness in order to be capable of withstanding high loads.

The difficulties of the above forming operations also lead to the problem of controlling the size of the hole or bore in the insert. The diameter of this fastener receiving bore must be carefully controlled in order that the fastener threads will be adequately bound and held against unwanted rotation while in place. If the diameter is too great the fastener may still work loose under vibration commonly present where stop nuts are used. If the diameter is too small the insert will bind too tightly and impose additional loads over and above the load to be applied by the material to be fastened and there is great danger that the bore of the insert will be stripped, destroying its locking effect. Since it is common practice to form the hole in the insert prior to the broaching, swaging or coining operations, deformation of the insert and consequential alteration of the insert bore diameter is likewise common.

The present invention obviates the above mentioned problems by providing a stop nut in which the insert is bound in an annular collar having a channel shaped cross section. The insert is rigidly gripped by pressing the radially inwardly directed channel sides against the peripheral portions of the opposing flat surfaces of the insert prior to the time when the fastener receiving opening is cut or bored in the insert.

The collar is then force fitted into a counterbore in the nut body until it contacts a shoulder formed at the point where the counterbore adjoins the axially aligned threaded fastener receiving bore in the nut body. The collar may be composed of metal and has a diameter slightly greater than the diameter of the counterbore adjacent the shoulder. The medium to heavy force fitting of the collar thus alters its diameter only a slight amount and causes the collar to be positively seized by the radial forces subsisting between it and the wall of the counterbore, thus immobilizing the collar and the insert against axial and rotational movement. The diameter of the fastener receiving hole of the insert is not altered by this operation since its outer diameter may be such that its edge is not in radially compressive contact with the base portion of the channel, the channel sides serving to grip the opposing surfaces of the insert.

Another feature of the fastener of the present invention is found in the fact that a heat resistant insert formed of axially stacked slotted shims or of an internally threaded metal washer may readily be mounted in the nut body instead of casting the metal insert in place in the nut body. When a metallic insert is used it is either cast in place in the collar or formed and then placed in the collar. If the customary undersize threads are to be formed in the insert bore they may thus be machined prior to placing the collar in the nut body. This procedure has the obvious advantage of avoiding changes in the properties of the nut body by reason of the heat given off during operations involving casting of the insert in place in the nut body.

The invention also embraces novel methods of manufacturing stop nuts having the above described characteristics.

Other features and advantages of the present invention will be apparent from the following description taken in connection with the accompanying drawing in which.

Figure 1:
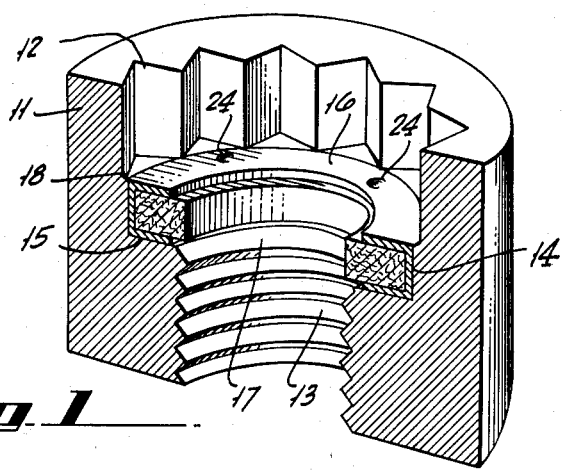
Figure 1 is a perspective view in vertical section of an internal wrenching elastic stop nut incorporating the invention.

Referring now to Figure 1, one form of the elastic stop nut of the present invention includes a nut body 11 provided with a socket 12 which is splined to engage a socket wrench. A bolt or fastener engaging threaded bore 13 extends inwardly from the opposite face of the nut body. A collar receiving counterbore 14 is provided between the inner end of the wrench receiving socket and the inner end of the threaded bore 13. It may generally be located at the center of the longitudinal passage formed in the nut body by the bore, counterbore and socket which are in axial alignment. For convenience in assembly the counterbore may be of a slightly smaller diameter than the crest diameter of the socket at the point 18 where the two meet. The counterbore must be of a diameter sufficiently greater than that of the threaded bore to provide a shoulder or seat 15 which conveniently, but not necessarily, extends radially outwardly from the inner end of the bore 13 as shown in Figure 1.

An elastically deformable annular metal collar 16 having a diameter slightly greater than that of the counterbore 14 is adapted to firmly grasp an insert or fastener binding means 17. The collar shown here has a generally channel-shaped cross section. However, it may have any type of trough shaped cross section which is suitable for retaining the binding means 17 against axial rotation. The fastener binding means may be any of the standard elastic, fibrous inserts, such as those of nylon, it may be an elastic internally threaded soft metal washer, or it may be comprised of stacked layers of elastic metal shims as will later be pointed out.

The primary requisite of the collar is that it be of an outside diameter slightly larger than that of the portion of the counterbore 14 adjacent the shoulder or seat 15. This permits the collar to be mounted firmly and permanently in the counterbore by a simple pressing or force fitting operation. This operation elastically decreases the diameter of the collar by a very small amount and generates radial compressive forces which hold the collar in position on the shoulder and prevent axial or rotational movement when the threaded fastener or bolt is turned into the insert bore. In this connection the very small annular tool cuts left in the counterbore wall by the machining operation aid in assuring a firm grip on the collar.

Figure 2:
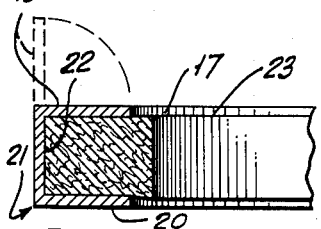
Figure 2 is a fragmentary vertical sectional view of the collar and the elastic binding means.

As best shown in Figure 2 the insert 17 may be laid in the flanged ring 21 and then secured therein by simply folding or crimping the annular portion 19 of the channel down against the upper surface of the insert to complete the collar 16. The major or outer diameter of the insert should be equal to or less than the interior diameter of the channel base 22 in order that the radius of the hole or bore 23 in the insert will not be changed by the radial forces that might otherwise exist. If desired, the hole or bore need not be formed until after the insert is gripped by the channel sides since this procedure assures the manufacturer that the insert bore will be the correct size. The crimping or folding operation will normally cause the channel sides 19 and 20 to bite into the fiber or elastic metal insert enough to insure against rotation in use. However, dimples 24 such as those shown in Figure 1 or any other suitable detent formations may be added to make certain that no slippage occurs.

Figure 3:
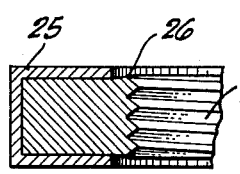
Figure 3 is a fragmentary vertical sectional view of the collar and a threaded metal insert.

Figure 3 illustrates the use of the collar 25, similar to collar 16, to grip an elastically deformable metal washer or insert 26. The washer may be cast in place after the collar is formed or the washer may be preformed and the channel formed around it as previously described. Likewise, the threads 27 which are customarily utilized in this type of insert may be formed either before or after the insert is mounted in its collar. As was previously pointed out, the novel elastic stop nut of the present invention enables the manufacturer to form a high strength heat resistant stop nut which is so constructed that it is not necessary to risk loss of strength properties by casting the metal insert in place in the nut body.

Figure 4:
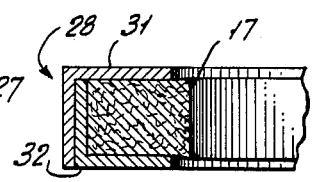
Figure 4 is a fragmentary vertical sectional view of the collar of the present invention in another form.

Figure 4 illustrates another form of collar 28 in which two mating annular rings 31 and 32, each having an angle shaped cross section, are force fitted together in a manner that grips the insert 17 therebetween and forms a channel shaped collar.

Figure 5:
Figure 5 is a vertical sectional view of another embodiment of the invention in which slotted metal shims are utilized.
Figure 6:
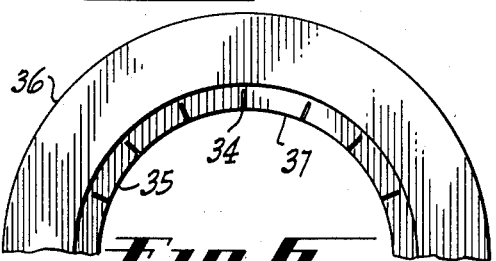
Figure 6 is a fragmentary plan view of the collar of Figure 5.

Figures 5 and 6 depict the details of another form of the present invention. In this instance the elastic binding means 37 includes axially stacked layers of washer shaped elastic metal shims 33, each of which is provided with a plurality of radial slots 34 about the periphery of the washer hole or bore 35. The slots preferably are formed after the shims are mounted in their collar 36 in order that the slots in each shim will be axially aligned with the slots in the adjacent shim. When the helical threads of the fastener bite into the binding means the slots will permit sections of each shim to be elastically twisted into a partial helix as they contact the V-shaped helical groove lying between the crests of the bolt threads. This twisting action caused by rotating the bolt into the binding means will generate the desired elastically urged friction forces which cause any elastic stop nut to function, for the displaced segments are resiliently urged toward their original position and thus frictionally engage the bolt threads. They also frictionally engage each other and damp out any tendency to vibrate in resonance with any vibration which may be applied to the bolt and nut. Sympathetic vibration of prior art metal inserts makes them lose contact intermittently with the bolt threads and permits the nuts to back off in service practically without resistance. Again, the use of the novel collar of this invention enables the manufacturer to produce an inexpensive heat resistant stop nut without the danger of destroying the strength properties of the nut body and without the use of the more inefficient broaching, swaging or beading operations on the relatively hard nut body.

Figure 7:
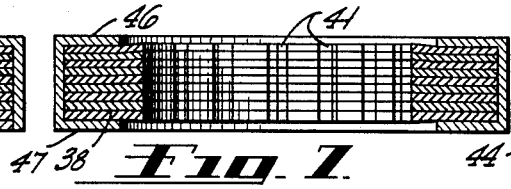
Figure 7 is a vertical sectional view of still another embodiment of the collar and insert of the present invention using notched metal shims.
Figure 8:
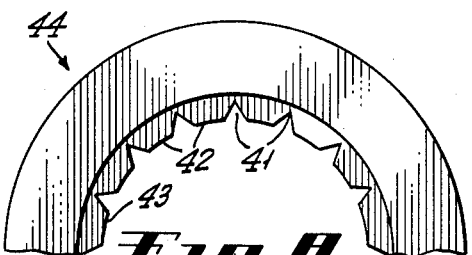
Figure 8 is a fragmentary plan view of the collar and insert of Figure 7.

Figures 7 and 8 illustrate another form of the heat resistant stop nut in which the axially stacked shims 38 are provided with a series of peripherally spaced and axially aligned notches 41 which leave a plurality of locking prongs 42 radially inwardly extending about the periphery of the bore 43 of the elastic stop washer 44. They function in a manner similar to that of the slotted shims of Figures 5 and 6, the notches facilitating separation of the shim segments to enter appropriate threads. In both of the forms of Figure 5 and Figure 7 it is preferable to pre-select the thickness of the individual layers so that at least two layers will enter a single trough between two adjacent threads of the bolt. They will then bind frictionally on each other as well as on the bolt threads, and such friction will effectively damp vibration. It is apparent that the bores 35 and 43 must have a minor or crest diameter which is less than the crest diameter of the fastener or bolt threads which they engage. Rotation of the shims relative to each other and relative to the collar is again prevented by the gripping force exerted by the channel sides 46 and 47 and by the machine tool marks normally present on their surfaces.

As is shown in Figure 5 it may be desirable to utilize a channel shaped collar 36 which comprises an annular ring 51 having an angle shaped cross section and a force fitted mating side or washer 49 which is pressed into position after the shims have been inserted in the ring. The side 49 is then held in position by the shoulder 15 of Figure 1 against which it is force fitted. Again this merely illustrates another method of forming the collar of the present invention.

Figure 9:
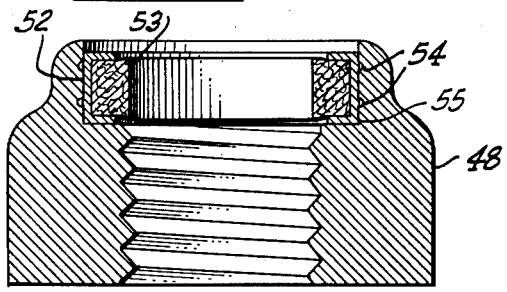
Figure 9 is a vertical sectional view of an external wrenching elastic stop nut incorporating the invention.

Figure 9 illustrates the use of the collar 52 and mounted insert 53 as applied to an externally wrenched stop nut 48. In this case the collar may be made of a metal that is softer than the material of the nut body. Annular grooves 54 may be formed in the wall of the counterbore thus enabling the softer metal of the collar 55 to extrude into these grooves when it is force fitted into position. The interlocking of the grooves and the collar metal thus provides additional resistance against axial displacement when the fastener is turned into position as is more fully explained in applicant's co-pending application, Serial No. 619,828, filed October 2, 1945, now abandoned. This feature is of course not essential in order to practice the invention. The use of the inserts described is not limited to nuts having wrenching surfaces for they may be applied to any type of anchor nut or to any member with a threaded bore in which a threaded shank is to be secured, and the term "nut" or "nut body" includes all such installations.

While it is highly desirable that the collar be located directly on the seat or shoulder, it will be seen that, because of its self-anchoring characteristics, it will work equally well even though through faulty manufacture it may be spaced somewhere along the length of the counterbore.

Although the now preferred embodiments and methods of the present invention have been illustrated and described it is to be understood that the invention need not be limited thereto for it is susceptible to changes in form, detail and application within the scope of the appended claims.

I claim:
1. A self-locking nut comprising: a nut body provided with a passage extending longitudinally therein; one part of said passage constituting a threaded bore for engagement with a threaded fastener, and an axially adjacent part of said passage constituting a cylindrical counterbore of larger diameter than said bore and in axial alignment therewith; an elastically deformable channel shaped collar located in said counterbore and having a channel base diameter greater than said counterbore when said collar is in its unstressed condition, said collar being held against rotation and axial displacement by virtue of the radial compressive forces subsisting between the outer periphery of said collar and the wall of said counterbore; and washer shaped elastic stop means including a plurality of flat thin plane washer shaped metal shims axially stacked in flat, facewise mutual contact throughout their mutually confronting areas, each having a plurality of radial slits in its inner periphery substantially axially aligned with the radial slits in the adjacent shim, said binding means being non-rotatably held between the channel sides of said collar.

2. A self-locking nut comprising: a nut body provided with a passage extending longitudinally therein; one part of said passage constituting a threaded bore for engagement with a threaded fastener, and an axially adajcent part of said passage constituting a cylindrical counterbore of larger diameter than said bore and in axial alignment therewith; an elastically deformable channel shaped collar located in said counterbore and having a channel base diameter greater than said counterbore when said collar is in its unstressed condition, said collar being held against rotation and axial displacement by virtue of the radial compressive forces subsisting between the outer periphery of said collar and the wall of said counterbore; and washer shaped elastic stop means including a plurality of flat thin washer shaped metal shims, said shims being axially stacked in mutual facewise parallelism and in mutual facewise contact throughout their major areas, each of said shims having a plurality of spaced notches formed in its inner periphery substantially axially aligned with the spaced notches in the adjacent shim, said binding means being non-rotatably held between the channel sides of said collar.

3. A self-locking nut comprising: a nut body provided with a passage extending longitudinally therein; one part of said passage constituting a threaded bore for engagement with a threaded fastener, and an adjacent part of said passage constituting a cylindrical counterbore of larger diameter than said bore and in axial alignment therewith; an elastically deformable channel shaped collar located in said counterbore and having a channel base diameter greater than said counterbore when said collar is in its unstressed condition, said collar being held against rotation and axial displacement by virtue of the radial compressive forces subsisting between the outer periphery of said collar and the wall of said counterbore; and washer shaped elastic stop means including a plurality of flat washer shaped metal shims said shims being axially stacked in mutual facewise parallelism and in mutual facewise contact throughout their major areas, each having a plurality of prongs formed about its inner periphery; said binding means being non-rotatably held between the channel sides of said collar.

References Cited in the file of this patent
UNITED STATES PATENTS

| Number | Name | Date |
|---|---|---|
| 248,975 | Wooten | Nov. 1, 1881 |
| 599,852 | Lufkin | Mar. 1, 1898 |
| 1,103,847 | Schneider | July 14, 1914 |
| 1,161,317 | Kielland | Nov. 23, 1915 |
| 1,883,916 | Houston | Oct. 25, 1932 |
| 2,049,366 | Gardner | July 28, 1936 |
| 2,255,948 | Swanstrom | Sept. 16, 1941 |
| 2,360,370 | Schroeter | Oct. 17, 1944 |
| 2,372,485 | Griffin | Mar. 27, 1945 |
| 2,390,726 | Mitchell | Dec. 11, 1945 |
| 2,429,103 | Mitchell | Oct. 14, 1947 |
| 2,437,751 | Mitchell | Mar. 16, 1948 |
| 2,477,430 | Swanstrom | July 26, 1949 |
| 2,510,076 | Cockrell | June 6, 1950 |

FOREIGN PATENTS

| Number | Country | Date |
|---|---|---|
| 236,806 | Great Britain | July 16, 1925 |
| 296,636 | Great Britain | Sept. 6, 1928 |
| 461,638 | Great Britain | Feb. 22, 1937 |
| 621,673 | Great Britain | Apr. 14, 1949 |